United States Patent [19]

Goettel

[11] Patent Number: 4,569,110

[45] Date of Patent: * Feb. 11, 1986

[54] SELF TAPPING DUCT FITTING AND METHOD OF USE

[76] Inventor: Richard J. Goettel, 8133 W. Montebello, Glendale, Ariz. 85303

[*] Notice: The portion of the term of this patent subsequent to Jan. 1, 2002 has been disclaimed.

[21] Appl. No.: 644,033

[22] Filed: Aug. 24, 1984

Related U.S. Application Data

[63] Continuation-in-part of Ser. No. 383,558, Jun. 1, 1982, Pat. No. 4,491,124.

[51] Int. Cl.⁴ ............ B21D 53/00; B21D 39/00; F23L 13/00; F15D 1/14
[52] U.S. Cl. .................. 29/157 R; 29/157 T; 29/432; 29/513; 126/153; 126/292; 138/39; 285/189; 285/424
[58] Field of Search ............ 29/157 R, 157 T, 512, 29/513, 432; 126/153, 290, 292, 293; 285/40, 158, 189, 424; 138/37, 39

[56] References Cited

U.S. PATENT DOCUMENTS

| | | | |
|---|---|---|---|
| 428,129 | 5/1890 | Osborn | 126/293 |
| 723,372 | 3/1903 | Dunbar | 126/293 |
| 2,215,318 | 9/1940 | Bristol | 29/513 |
| 2,507,885 | 5/1950 | Byrnes | 285/189 X |
| 2,733,889 | 2/1956 | Mattingly | 126/292 X |
| 2,963,783 | 12/1960 | Field | 285/189 X |
| 3,122,170 | 2/1964 | Hickman | 138/37 |
| 3,290,066 | 12/1966 | Primich et al. | 285/424 X |
| 3,349,792 | 10/1967 | Larkin | 285/40 X |
| 3,364,939 | 1/1968 | Valenziano | 29/157 R |
| 3,477,745 | 11/1969 | Williams et al. | 285/40 |
| 3,726,545 | 4/1973 | Grim et al. | 285/40 X |
| 3,894,302 | 7/1975 | Lasater | 138/37 X |
| 3,915,477 | 10/1975 | Timmons | 29/157 R |

Primary Examiner—Howard N. Goldberg
Assistant Examiner—Ronald S. Wallace
Attorney, Agent, or Firm—Herbert E. Haynes, Jr.

[57] ABSTRACT

A duct fitting for connecting a branch duct to a main duct including a tubular body having cutting teeth formed on one end thereof for cutting a hole in the main duct by pressing the cutting teeth against the main duct and rotating the tubular body about its longitudinal axis. Subsequent to cutting of the hole, the cutting teeth are bent into engagement with the interior of the main duct to squeezingly hold the main duct between the bent over teeth and a resiliently deflectable mounting flange provided on the tubular body. An air diversion scoop is mounted in the bore of the tubular body and is pivotably moved so that a portion of the scoop extends from the tubular body into the main duct.

16 Claims, 11 Drawing Figures

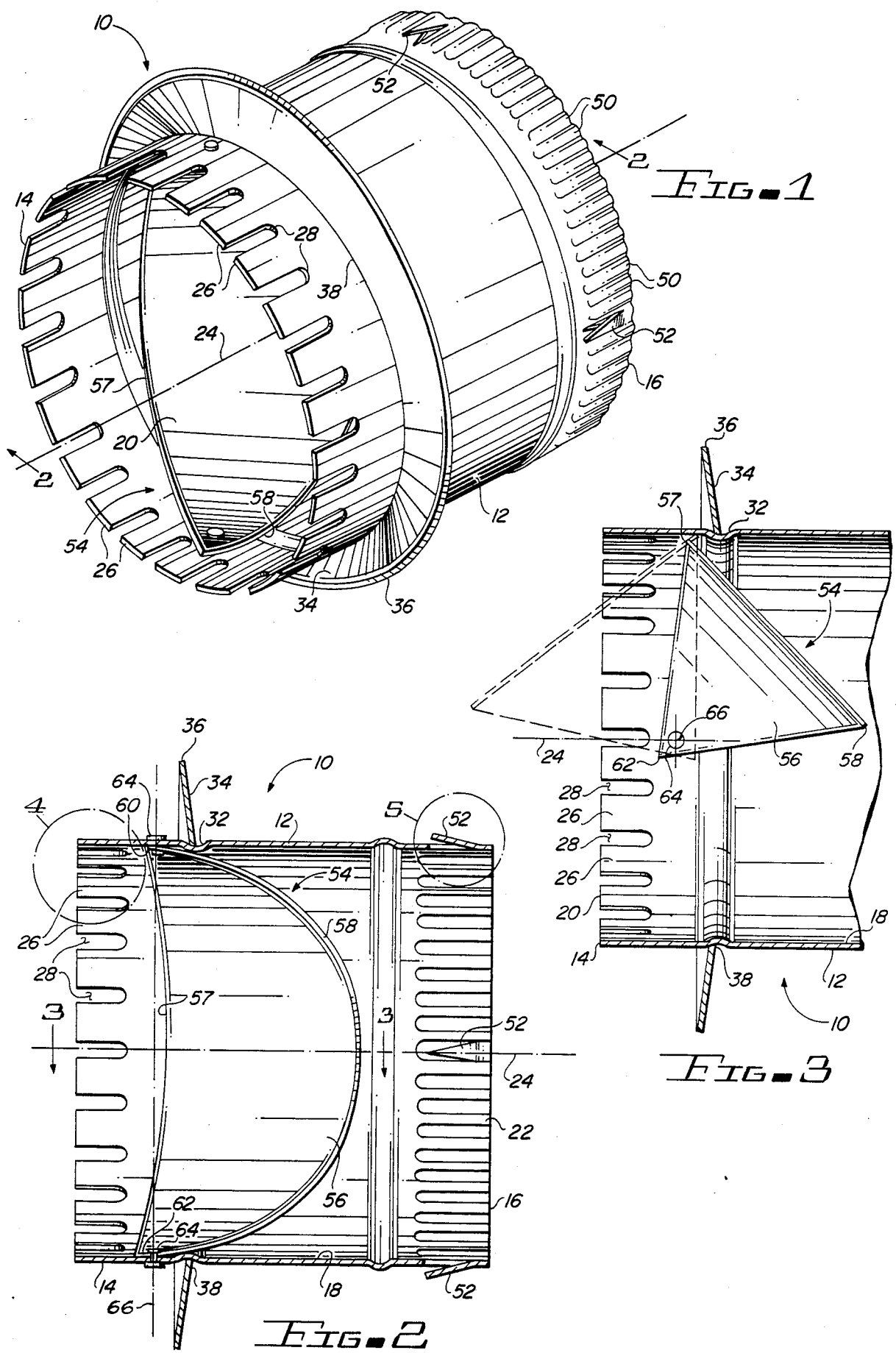

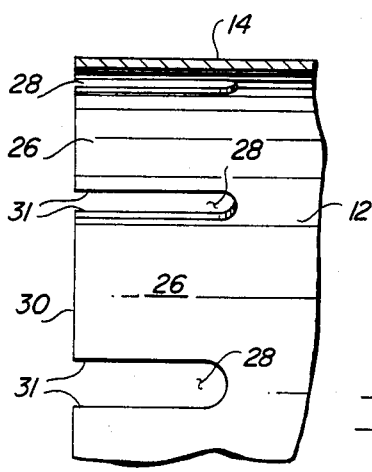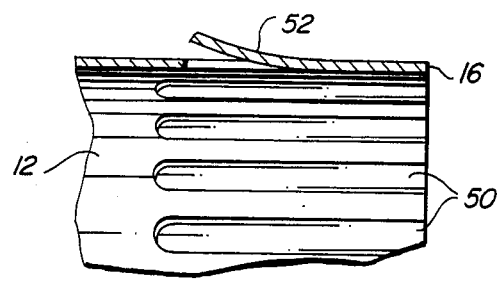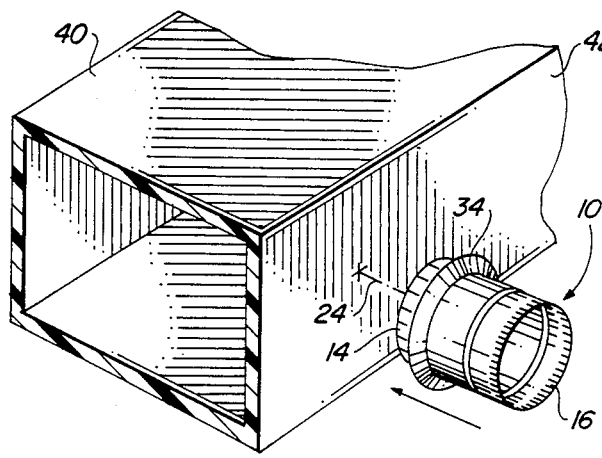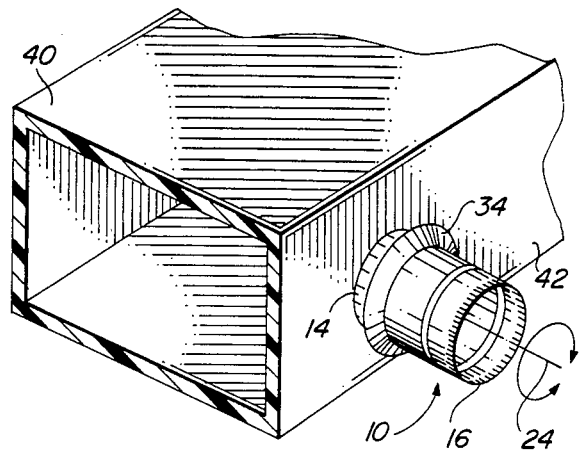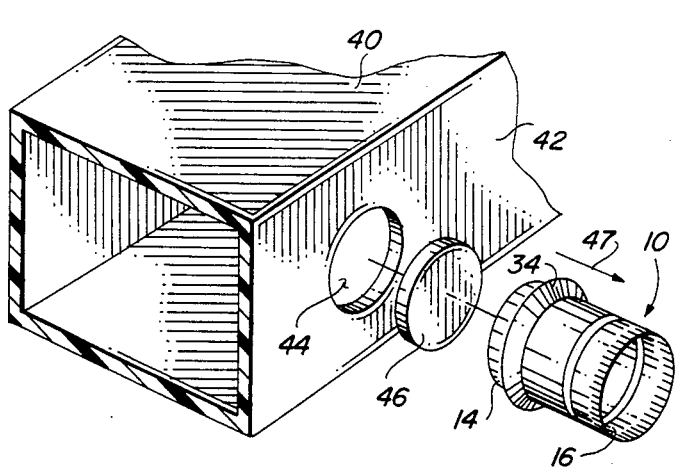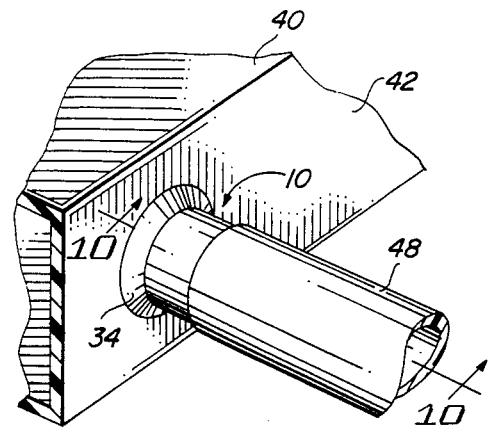

SELF TAPPING DUCT FITTING AND METHOD OF USE

CROSS REFERENCE TO RELATED APPLICATION

This application is a continuation-in-part of my co-pending U.S. patent application, Ser. No. 383,558, filed June 1, 1982, entitled: Self-Tapping Duct Fitting, which issued on Jan. 1, 1985 as U.S. Pat. No. 4,491,124.

BACKGROUND OF THE INVENTION

1. Field of the Invention

This invention relates generally to ducting as used in air conditioning systems, and more particularly to a duct fitting for interconnecting such ducting.

2. Description of the Prior Art

It is customary in the heating, cooling and ventilating field to use a main, or trunk duct, having extending from it one or more branch ducts. Various fittings have been proposed for connecting a branch duct to an associated main duct. One manner of attaching a fitting to a duct is shown in U.S. Pat. No. 3,290,066 issued Dec. 6, 1966 to T. Primich et al wherein a plurality of tabs formed so as to extend axially from the fitting are bent over in order to secure a fitting on an associated duct. A significant problem, however, with regard to time, tools and the relatively high degree of skill required to accurately cut a properly sized hole in the trunk duct, which may be constructed from a rigid or flexible material, such as reinforced fiberglass and the like, prior to insertion and attachment of the branch duct fitting.

U.S. Pat. No. 3,349,792 issued Oct. 31, 1967 to M. E. Larkin, and U.S. Pat. No. 3,609,056 issued Sept. 28, 1971 to E. D. Hougen, disclose examples of hole cutting tools which can be used for cutting holes in air conditioning ducting. A basic disadvantage of this approach, however, is that a large number of cutting tools of various sizes must be kept available in order to cut a hole which is sized properly for a specific duct fitting. Further, there can be difficulty in inserting a fitting into a hole cut for it, if the pre-cut hole is irregular, or too small, and if the hole is too large, the fitting will be loose and most likely it will be a source of undesirable air leakage.

Another problem encountered with the installation of branch duct fittings to main ducts of air conditioning systems, and the like, is that there must be found a manner of attaching the fitting to the duct. Other than the use of the aforementioned bent tabs, it is a common practice to employ bolts and similar fasteners which result in projection of the ends of the fasteners into the main duct. Such projections are generally undesirable, inasmuch as they cause turbulence in the air stream within the duct.

Accordingly, it has been proposed to provide quick connection arrangements on duct fittings in order to eliminate the attachment problems referred to above, as well as to insure a good fit between the fitting and an associated duct. Examples of such quick connections can be found in U.S. Pat. No. 3,477,745 issued Nov. 11, 1969 to J. W. Williams et al, and U.S. Pat. No. 3,915,477 issued Oct. 28, 1975 to D. R. Timmons. These fittings are intended specifically for use with reinforced fiberglass ducts and employ helical rings formed about the periphery of the connection end of the fitting which permit the connection end of the fitting to be threaded through a pre-cut hole. Once threaded through the duct, the split ring or flange retains the fitting in place on the duct.

With the above approach, however, not only is it first necessary to pre-cut a hole in the associated duct, the problems of which are discussed above, but during insertion of the fitting into the hole, the helical rings tend to tear or shred the wall in the area circumscribing the hole. This also is the case with U.S. Pat. No. 3,726,545 issued Apr. 10, 1973 to J. R. Grim et al which discloses an air duct connector especially for use with reinforced fiberglass ducts in which the leading edge of the connector is provided with widely spaced cutting teeth for initially forming a circular aperture in the duct wall. Widely spaced radially extending tabs are provided proximate the cutting teeth for being threaded into the hole during cutting thereof to lock the fitting in the hole in the trunk duct wall. Besides tearing, or shredding the wall, a disadvantage of this construction is that the cutting teeth which are not intended to be bent over, will extend into the fluid flow path of the trunk duct so as to cause turbulence therein. Further, in order to remove the cutout portion, or slug, of the duct wall from the interior of the duct, which can cause turbulence, air flow restriction, noise, and the like, if left in the duct, it must be removed carefully through the mounting fitting in order to avoid the projecting cutting teeth.

Poorly fashioned cuts such as the pre-cutting of holes by free hand use of a knife, razor blade, and the like, as required in some of the hereinbefore described prior art fittings, usually results in loose fits and air leakage. Also, sidewall tearing or shredding resulting from the use of other above discussed prior art fittings, can result in leakage prone weak spots in the areas where the fittings are mounted to the trunk duct. In addition, shredded fibers must be kept out of the air moving in the duct system to prevent the known health hazard associated with airborne fibers.

Regardless of the technique used to mount a branch line fitting in a main, or trunk duct, a problem has long existed with regard to diverting air out of the air flow stream in the trunk duct into the branch duct. In many prior art systems, this air diversion problem is simply ignored with the result being that air pressure in the trunk duct will be totally relied upon to cause some air to move into the branch duct. In most instances, this results in inadequate air flow in the branch lines.

In my prior co-pending U.S. patent application, Ser. No. 383,558, filed June 1, 1982 for a Self-Tapping Duct Fitting, I attempted to solve the air diversion problem by pivotably mounting a flat plate damper in the duct fitting and providing a suitable linkage so that subsequent to fitting installation, the damper could be moved to a fully open position wherein a relatively small portion of the flat plate extended from the fitting into the air stream of the trunk duct. While this improved the situation with regard to the air diversion problem discussed above, the air striking the flat plate damper created considerable turbulence both in the trunk duct and in the branch duct, and acted as a restriction in those air streams. In addition, the relatively expensive damper, and its mounting arrangement, and linkage were far too costly for the minimal results achieved therefrom.

Therefore, a need exists for a new and improved duct fitting and method for mounting thereof which overcomes some of the problems and shortcomings of the prior art.

SUMMARY OF THE INVENTION

In accordance with the present invention, a new and improved duct fitting is disclosed for connection of a branch duct to a main, or trunk duct. The duct fitting of the present invention includes a tubular sleeve-like body of cylindrical configuration having its opposite ends open and defining a longitudinal axis. A first one of the open ends of the tubular body is circumscribed by an alternately radially disposed plurality of tooth-like projections and separating slots which extend axially from the first open end a relatively short distance into the tubular body. An annular groove is formed in the periphery of the tubular body in axially spaced proximity to the first open end of the tubular body, and a mounting flange of truncated conical configuration is mounted in the annular grooe so as to circumscribe the tubular body. The relatively smaller circular end of the truncated conical mounting flange is disposed in the annular groove formed in the tubular body and the relatively larger opening thereof faces towards the first open end of the tubular body.

The tubular body and mounting flange of the duct fitting are formed of relatively thin gauge sheet metal to provide each of the teeth with an opposed pair of cutting edges and to provide the truncated conical mounting flange with an inherent spring-like resistance against axial forces applied to the end thereof which circumscribes the relatively large circular opening defined by the flange. The alternate arrangement of teeth with cutting edges separated by slots and the truncated conical mounting flange provide the duct fitting of the present invention with improved self-tapping and fitting mounting characteristics.

By placing the duct fitting so that its first open end is in bearing engagement with the sidewall of the main duct with the longitudinal axis of the duct fitting being normal to the main duct, and rotating the duct fitting in a back and forth movement about its longitudinal axis, the cutting teeth of the duct fitting will cut a prefectly sized hole in the main duct without tearing or shredding of the main duct. When the hole is completely cut in this manner, the circular cut out, or slug, will be lodged in the first open end of the tubular body of the duct fitting and can be easily dislodged by extracting the duct fitting from the cut hole and pushing the slug out of the bore of the tubular body.

When the hole cutting and slug extraction operations are completed, as described above, the first open end of the tubular body is reinserted into the cut hole to bring the relatively larger open end of the truncated conical mounting flange into bearing engagement with the sidewall of the main duct and this will locate the cutting teeth of the tubular body within the main duct. Then, an installer will push the duct fitting toward the main duct to apply an axially deflecting force on the truncated conical mounting flange and while maintaining this pushing force reach through the second open end of the tubular body and bend the cutting teeth over into bearing engagement with the inner surface of the sidewall of the main duct. When mounted in this manner, the portion of the sidewall of the main duct which circumscribes the cut hole will be disposed between the bent over teeth and the mounting flange and will be squeezingly held therebetween due to the inherent resiliency of the truncated conical mounting flange which will exert a spring-like force in the direction opposite to the axially applied deflection forces exerted thereon during the installation operations.

As a result of the hole cutting and mounting operations described above, the duct fitting of the present invention is connected to a main duct in a minimal amount of time and with a minimal expenditure of effort without requiring the use of any tools, special or otherwise. And, the end result is that the duct fitting is firmly held in a leak-proof manner in a precisely sized non-shredded hole formed in the sidewall of the main duct.

In addition to advantages provided by the cutting teeth and the truncated conical mounting flange, the duct fitting of the present invention is provided with an especially configured air diversion scoop which is provided to divert some of the air from the air stream of the main duct and positively direct it into the branch duct in a manner which produces minimal air turbulence. the air diversion scoop is of lunate configuration, i.e. a lune having a surface bounded by two intersecting circular arcs with the lune being of crescent shape so that the surface thereof is curved. The lunate shaped air diversion scoop is pivotaby mounted in the bore of the tubular body of the duct fitting proximate the first open end thereof for movement between a retracted inoperative position and an extended operative position. In the retracted position, the air diversion scoop is disposed entirely within the bore of the tubular body so that the bore is substantially open which allows the above described installation operations to be accomplished. Subsequent to installation of the duct fitting, the air diversion scoop is pivotably moved to the extended position wherein slightly less than half of the scoop extends from the duct fitting into the air stream of the main duct. In this extended position, the air diversion scoop will present a smooth curved surface to the air moving in the air stream of the main duct, and this will positively divert a part of the air into the duct fitting and accomplish this air diversion with a minimal amount of air turbulence and restriction.

The second open end of the tubular body of the duct fitting of the present invention may be of any configuration suitable for connection to a suitable branch duct.

Accordingly, it is an object of the present invention to provide a new and improved duct fitting for connecting a branch duct to a main, or trunk duct.

Another object of the present invention is to provide a new and improved duct fitting which is inexpensive to fabricate and is simple to use.

Another object of the present invention is to provide a new and improved duct fitting which simplifies the mounting thereof in a main duct by providing self-contained means for forming a precision cut opening in the main duct and providing means for firmly mounting the fitting in the cut hole.

Another object of the present invention is to provide a new and useful duct fitting which is formed with an alternately arranged array of teeth and separating slots on one end thereof for cutting a perfectly sized mounting hole in the main duct without tearing out or shredding the duct.

Another object of the present invention is to provide a new and useful duct fitting of the above described character wherein the cutting teeth are bent over into engagement with the inner surface of the duct fitting subsequent to the hole cutting operation and interact with a special mounting flange provided on the duct fitting to firmly mount the fitting on the main duct.

Another object of the present invention is to provide a new and improved duct fitting of the above described character which further includes an air diversion scoop mounted in the bore of the duct fitting for positively directing air from the air stream of the main duct into the duct fitting in a manner which minimizes the air turbulence and air flow restriction.

The foregoing and other objects of the present invention, as well as the invention itself, will be more fully understood from the following description when read in conjunction with the accompanying drawings.

BRIEF DESCRIPTION OF THE DRAWINGS

FIG. 1 is a perspective view of the duct fitting of the present invention illustrating the various features thereof.

FIG. 2 is an enlarged sectional view taken along the line 2—2 of FIG. 1.

FIG. 3 is a fragmentary sectional view taken along the line 3—3 of FIG. 2.

FIG. 4 is an enlarged detail view showing the encircled area which is designated "4" in FIG. 2.

FIG. 5 is an enlarged detailed view showing the encircled area which is designated "5" in FIG. 2.

FIGS. 6, 7, 8 and 9 are fragmentary perspective diagrammatic views illustrating the various steps followed in installing the duct fitting of the present invention in a main, or trunk duct.

DESCRIPTION OF THE PREFERRED EMBODIMENT

Figure 10:
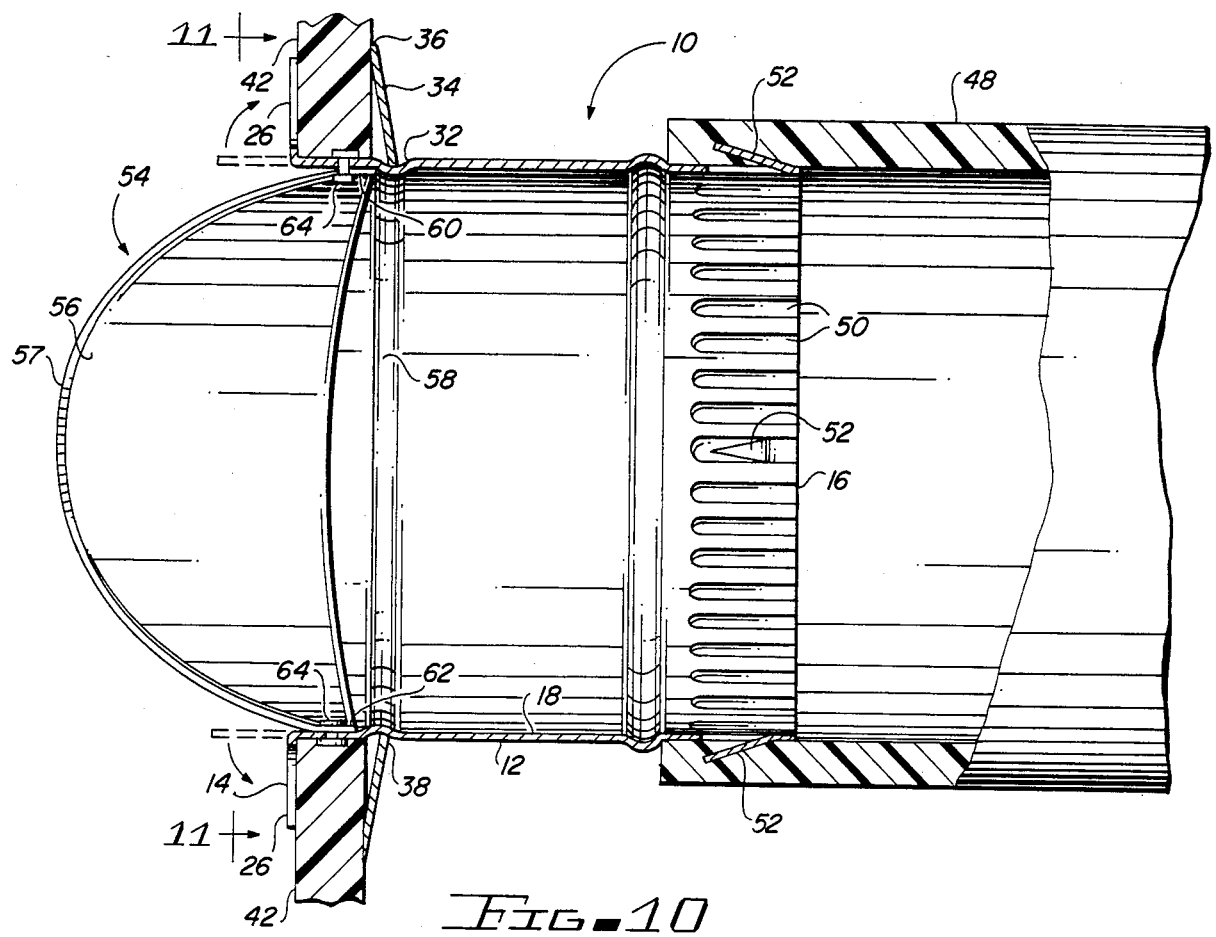
FIG. 10 is a sectional view taken along the line 10—10 of FIG. 9.

Referring more particularly to the drawings, FIGS. 1, 2 and 3 best show the duct fitting of the present invention which is indicated in its entirety by the reference numeral 10. The duct fitting 10 includes a tubular sleeve-like body 12 having a first end 14 and an opposite end 16 and defining an axial bore 18 the opposite ends of which are open as at 20 and 22, and further defining a longitudinal axis 24.

The tubular sleeve-like body 12 is illustrated as being of cylindrical configuration and this is the preferred embodiment. However, as this description progresses, it will be seen that the first end 14 must be circular in cross section in order for the duct fitting 10 to accomplish its intended function. However, the second end 16 of the body 12 may be of any desired cross section such as square or rectangular, and if so configured, the tubular body 12 would then be configured as what is referred to in the art as a transition duct.

In any case, the duct fitting 10 is formed of a thin guage resiliently deformable self-supporting material such as 28 or 30 gauge galvanized sheet metal.

The first end 14 of the duct fitting 10 is provided with an especially configured interrupted edge including a plurality of axially extending alternately arranged tooth-like projections 26 with spacing slots 28. The teeth 26 and slots 28 are disposed in substantially equally spaced radial increments in the first end 14 of the body 12 and thereby form the interrupted edge which circumscribes the open end 20 of the tubular body 12.

As will hereinafter be described in detail, the alternately arranged plurality of teeth 26 and slots 28 serve a dual purpose, i.e., cutting a precision hole in an associated duct and then mounting the duct fitting 10 therein. It has been found that by forming the teeth 26 and slots 28 in the manner best shown in FIG. 4 provides ideal results in accomplishment of the above mentioned two objectives. As shown, each of the teeth 26 have a linear extending edge 30 with a spaced apart pair of oppositely facing side edges 31 which are substantially parallel with respect to each other. Since the tubular body 12 is formed of thin guage material as mentioned above, the side edges 31 and 32 of each of the teeth 26 will form a cutting edge. While the relative dimensions of the teeth 26 and the slots 28 may vary, it has been found that if the slots are narrower than the teeth, ideal cutting and mounting characteristics are achieved. By way of example, the extending length of the teeth 26, and thus the depth of the sots 28, may be approximately 0.9 inches, and the width of each tooth 26 can be approximately 0.8 inches and the width of each slot 28 can be about 0.2 inches.

An endless annular groove 32 is formed in the tubular body 12 in axially spaced proximity to the first edge 14 of the body and a special mounting flange 34 is mounted therein. The mounting flange 34 is in the shape of a truncated cone having a relatively large circular end 36 and a relatively smaller circular end 38. The smaller circular end 38 of the conical flange is disposed in the annular groove 32 and the larger end 36 faces toward the first end 14 of the tubular body 12. The mounting flange 34 is preferably formed of the same material as the tubular body 12 and therefore is a resiliently deformable self-supporting structure. The purpose and function of the mounting flange 34 will hereinafter be described in detail.

Reference is now made in particular to FIGS. 6 through 9 wherein the various steps involved in the mounting of the duct fitting 10 to an associated main, or trunk duct 40 are illustrated.

The main duct 40 is representative of a conventional structure normally used in air conditioning applications and is of generally rectangular cross section and is formed, for example, of suitably reinforced fiberglass. The main duct 40 includes a sidewall 42 in which the duct fitting 10 of the present invention is to be mounted. When the desired position on the main duct wall 42 has been determined, the first end 14 of the tubular body 12 is placed in abutting relationship with the sidewall 42 in a manner which places the longitudinal axis 24 of the duct fitting 10 in a normal relationship with respect to the sidewall. The installer (not shown) then rotates the duct fitting 10 about the axis 24 in a back and forth rotational movement while pushing the duct fitting toward the main duct 40. This action will cause the cutting edges 31 of the teeth 26 to cut through the sidewall 42 of the main duct 40 to form a hole 44 therein. The especially configured tooth and slot arrangement herein-before described will smoothly cut the hole 44 without tearing and with little, or no shredding of the sidewall portions which circumscribe the hole.

Once the hole 44 has been cut in the above described manner, the cut out piece, or slug 46, will be located in the open end 20 of the tubular body 12 and will be moved out of the hole 44 upon extraction of the duct fitting 10 such as indicated by the arrow 47 in FIG. 8. When extracted, the installer then reaches into the bore 18 of the tubular body 12 through the second open end 16 thereof and simply pushes the slug 46 out of the opening 20 in the end 14 of the body 12. It will be appreciated that the slug 46 could be pushed out of the duct fitting 10 without extracting the fitting from the hole 44. This would result in the slug being deposited within the main duct 40. This is undesirable in that the loose slug 46 could produce noise and interfere with air movements through the main duct.

Subsequent to pushing of the slug 46 out of the duct fitting 10, the duct fitting is reinstalled in the hole 44 in a manner which moves the large circular end 36 of the mounting flange 34 into abutting engagement with the exterior surface of the main duct sidewall 42. Due to the axially spaced relationship of the mounting flange 34 with respect to the first end 14 of the body 12, the teeth 26 will extend into the interior of the main duct 40 in the manner indicated in dashed lines in FIG. 10. Then while pushing on the second end 16 of the duct fitting 10, the installer (not shown) reaches through the bore 18 of the duct fitting 10 and bends the teeth 26 radially outwardly into bearing engagement with the interior surface of the main duct sidewall 42 as indicated in solid lines in FIG. 10 and in FIG. 11. As a result of the pushing force being exerted by the installer during bending over of the teeth 26, an axial force will be exerted on the mounting flange 34 by the sidewall 42 to deflect it toward the second end 16 of the duct fitting 10. When the bending over operation is completed and the installer applied pushing force removed, the inherent resiliency of the mounting flange 34 will apply a squeezing force on the portion of the sidewall 42 which is captively retained between the bent over teeth and the mounting flange. Due to the hereinbefore described precision hole cutting capability of the duct fitting 10 and the above described squeezing force exerted on the main duct sidewall 42, the duct fitting 10 is tightly mounted in the hole 44 of the sidewall 42 in a leak-proof manner.

Figure 11:
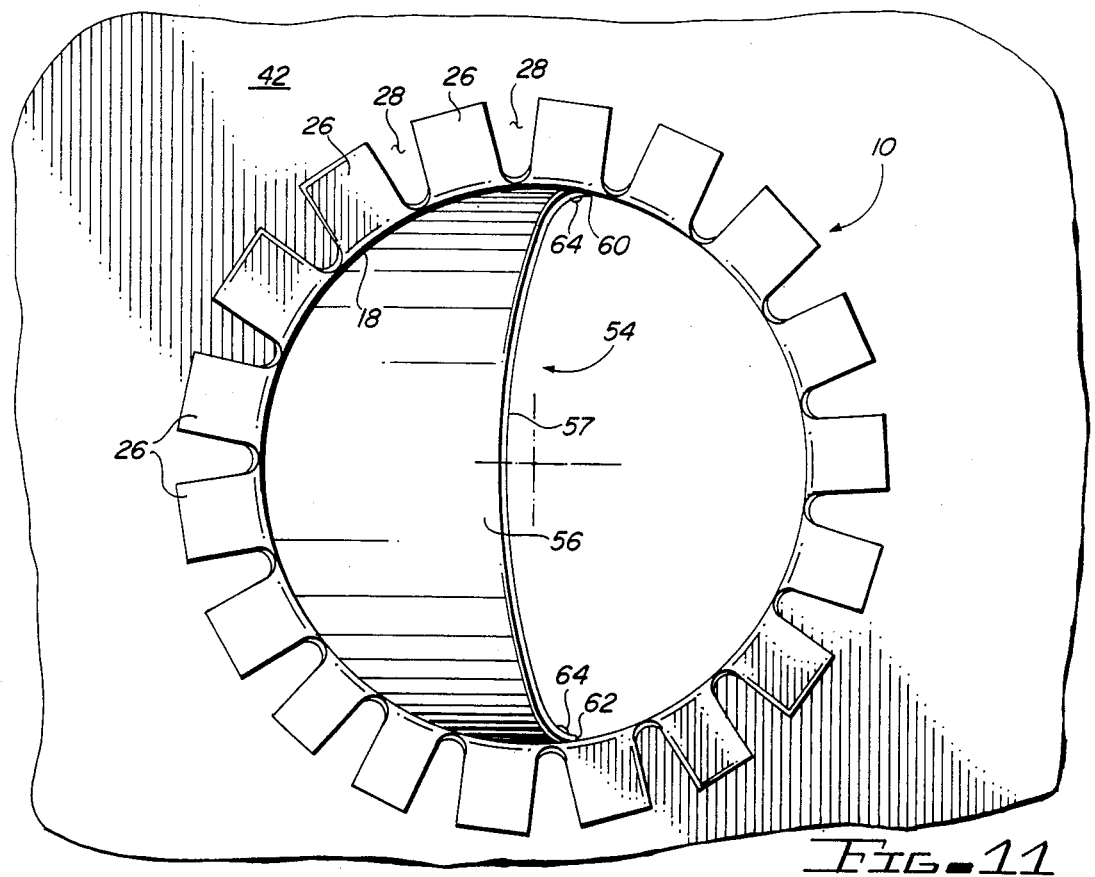
FIG. 11 is a fragmentary view taken along the line 11—11 of FIG. 10.

An aditional benefit derived from the special tooth 26 and slot 28 arrangement is that when bent over as described above, the result will be that very little of the raw cut edge of the main duct sidewall 42 which circumscribes the hole 44 will be exposed to the air stream within the main duct 40. And even those relatively small exposed areas will be firmly held in place by the bent over teeth 26 as shown in FIG. 11. Therefore, little, or no loosening or dislodging of the fibers of the duct sidewall material will occur as a result of air movement and as is well known, fibers of this sort should not be allowed to enter the air stream.

When the duct fitting 10 is mounted to the main duct 40 as described above, a branch duct 48 is connected to the second end 16 of the tubular body 12. While the second end 16 may be of any desired cross-sectional configuration, as hereinbefore mentioned, it is preferrably circular so as to accept a commonly used conventional flexible air duct such as the one indicated at 48. A commonly used duct of this sort can be, for example, a double laminated polyester hose which is confiured to encapsulate a helix wound steel wire, and which complies with the requireents of NFPA 90A and FHA minimum property standards. In particular, the flexible duct 48 could be a UL 181 class I air duct such as marketed by "ATCO" in their 600 series.

The duct 48 is fitted on the second end 16 of the tubular body 12 over radially arranged axial corrugations 50 formed in that end of the body as is customary. When the end of the flexible duct 48 is axially moved onto the second end 16 of the tubular body 12, the duct 48 will slide over a plurality of pointed projections 52 which catch the duct and hamper its axial movement in the opposite direction. The projections 52 are generally in the form of isosceles triangles with the base being integral with the tubular body 12 and the apex extending toward the first end 14 of the tubular body. The projections 52 may be formed, such as by a well known stamping operation, and are offset from the tubular body to provide the desired duct catching capability. The flexible duct 48 may be further secured to the duct fitting, as required, by using suitable tie straps (not shown) duct tape (not shown) or the like.

An air diversion scoop means 54, which is preferably formed of the same material as the tubular body 12 and the mounting flange 34, is mounted in the bore 18 of the tubular body 12 in axially spaced proximity to the first end 14 thereof for positively diverting some of the air from the main air movement path in the main duct 40 into the branch duct 48. The air diversion scoop means 54 is of lunate configuration, i.e. it defines a lune having a surface 56 which is bounded by two intersecting arcuate edges 57 and 58, with the lune 54 being bent over into a generally crescent shape so that the surface 56 is curved as shown. The apexes 60 and 62 provided at the opposite ends of the lune 54 are connected to the internal surface of the tubular body 12 at diametrically opposed sides thereof such as by rivets 64. And, the air deflecting lune 54 is pivotably movable about an axis 66 defined by the rivets. The air deflecting lune 54 is pivotably movable between a retracted position shown in solid lines in FIG. 3 and an extended position shown in dashed lines in FIG. 3, and again in solid lines in FIGS. 10 and 11.

In the retracted position, the air diversion scoop 54 will be fully contained within the bore 18 of the duct fitting and yet will provide the necessary access through the bore 18 for mounting of the duct fitting 10 on the main duct 40 as described above. Subsequent to duct fitting installation, the installer simply pivotably moves the scoop 54 about its pivot axis 66 to the illustrated extended position wherein slightly less than half of the scoop extends beyond the first end 14 of the duct fitting 10 and thus extends into the air stream of the main duct 40 as seen best in FIG. 10.

As seen best in FIG. 2, the pivot axis 66 of the air deflection scoop 54 is located between the array of teeth 26 and slots 28 and the inwardly protruding convex surface of the hereinbefore described annular groove 32. As a result of this, the air deflection scoop 54 will be in frictional engagement with the convex surface of the groove 32 and this will yieldably hold the scoop in the retracted position. When pivotably moved to the extended position, the arcuate edge 58 of the scoop will move off of the convex surface of the groove 32 toward the surface of the tubular body which defines the bore 18, thereof, this will lock the scoop 54 in the extended position.

While the principles of the invention have now been made clear in an illustrated embodiment, there will be immediately obvious to those skilled in the art, many modifications of structure, arrangements, proportions, the elements, materials and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A duct fitting for connecting a branch duct to a main duct comprising:

(a) a tubular body defining a bore and having a first open end of circular cross section and defining a longitudinal axis;

(b) cutting and mounting means on the first open end of said body for cutting a hole in the main duct when placed in abutting engagement therewith and said body is rotated about the longitudinal axis and for mounting the first open end of said body in the cut hole of the main duct, said cutting and mounting means including a plurality of alternately arranged teeth and separating slots formed axially and arranged radially on the first open end of said body;

(c) a resiliently deflectable mounting flange circumscribingly mounted on the periphery of said body proximate the first open end thereof for biasingly engaging the exterior surface of the main duct upon mounting of said body thereon;

(d) said tubular body being formed of a relatively thin gauge metal to provide each of said plurality of teeth with cutting edges and to allow said teeth to be bent over into engagement with the interior surface of the main duct upon mounting of said body thereon; and (e) air diversion scoop means mounted in the bore of said body for pivotable movement between a retracted position and an extended position wherein at least a portion of said air diversion scoop means extends beyond the first open end of said body.

2. An duct fitting as claimed in claim 1 wherein said air diversion scoop means is a lunate crescent shaped member.

3. A duct fitting as claimed in claim 1 wherein said air diversion scoop means is a member of lunate crescent configuration for positively directing a portion of the air movement in the main duct into said tubular body with minimal turbulence when said body is mounted on the main duct and said scoop means is in the extended position.

4. A duct fitting as claimed in claim 1 wherein said air diversion scoop means includes a sheet metal member bounded by two intersecting arcuate edges forming an apex at each of the opposite ends thereof, said sheet metal member being bent into a crescent shape.

5. A duct fitting as claimed in claim 4 and further comprising means for pivotably mounting the two apexes of said sheet metal member in the bore of said tubular body in diametrically opposed relationship with respect to each other.

6. A duct fitting as claimed in claim 4 wherein said sheet metal member is pivotably mounted in the bore of said tubular body proximate said cutting and mounting means so that when said scoop means is in the extended position slightly less than one-half of said sheet metal member will extend beyond the first open end of said tubular body.

7. A duct fitting as claimed in claim 1 and further comprising means for providing an interference fit of said air diversion scoop means in the bore of said tubular body for releaseably holding said scoop means in the retracted position thereof and lockingly holding said scoop means in its extended position upon movement thereof to its extended position.

8. A duct fitting as claimed in claim 7 wherein said means for providing an interference fit is in the form of an annular groove formed about the periphery of said tubular body which provides an annular protrusion in the bore defined by said tubular body.

9. A duct fitting as claimed in claim 1 and further comprising:

(a) said tubular body having an annular groove formed about the periphery thereof proximate the first open end of said body; and (b) said resiliently deflectable mounting flange being of truncated conical configuration having a relatively small open end which is disposed in the annular groove of said tubular body and a relatively large open end which faces toward the first open end of said tubular body.

10. A duct fitting as claimed in claim 1 wherein each of the separating slots of said cutting and mounting means is narrower than each of said plurality of teeth.

11. A duct fitting as claimed in claim 1 wherein each of said plurality of teeth has a width dimension which is at least ¼ of the total width of one of said teeth and one of said separating slots.

12. A duct fitting as claimed in claim 1 wherein each of said plurality of teeth has an extending linear edge and a spaced apart pair of side edges which are substantially parallel with each other.

13. A duct fitting as claimed in claim 1 wherein said tubular body has a second open end for mounting of one end of the branch duct thereon.

14. A duct fitting as claimed in claim 1 wherein said tubular body has a second open end upon which one end of the branch duct is axially slidably mountable.

15. A duct fitting as claimed in claim 14 wherein said tubular body is provided with means adjacent the second open end thereof for catching this branch duct upon mounting thereof on said tubular body to hamper axial movement of the branch duct off of said tubular body.

16. A method for cutting a hole in the wall of a main duct and mounting a duct fitting therein comprising the steps of:

(a) forming a cylindrical tubular duct fitting with an annular interrupted open end edge including an alternately arranged plurality of teeth and relatively narrower separating slots;

(b) mounting a resiliently deflectable metal mounting flange about the periphery of said duct fitting adjacent the interrupted edge thereof;

(c) mounting an air diversion scoop in the bore of said duct fitting for movement from a retracted to an extended position;

(d) pressing the interrupted edge of said duct fitting against the main duct in which said duct fitting is to be mounted;

(e) rotating said duct fitting about its longitudinal axis simultaneously with step d so that the interrupted edge thereof cuts a hole in the main duct;

(f) removing said duct fitting from the cut hole of the main duct to extract the cut out piece therefrom;

(g) pushing the cut out piece out of the bore of said duct fitting;

(h) reinstalling the interrupted open edge of said duct fitting in the cut out hole in the main duct to move said resiliently deflectable mounting flange into bearing engagement with the main duct fitting;

(i) pressing said duct fitting toward the main duct to axially deflect said mounting flange in a direction away from the main duct;

(j) bending the teeth of the interrupted edge of the duct fitting into bearing engagement with the interior surface of the main duct simultaneously with step i; and (k) moving said air diversion scoop from its retracted position to its extended position wherein at least a portion thereof extends from said duct fitting into the main duct.

* * * * *